United States Patent
Asuke et al.

(10) Patent No.: US 7,638,900 B2
(45) Date of Patent: Dec. 29, 2009

(54) BI-DIRECTIONAL DC-DC CONVERTER

(75) Inventors: Hideki Asuke, Niiza (JP); Hideharu Takano, Niiza (JP); Masaki Kanazawa, Niiza (JP); Mamoru Tsuruya, Niiza (JP); Masayoshi Yamamoto, Matsue (JP); Hirotaka Hara, Matsue (JP); Shigeyuki Funabiki, Matsue (JP)

(73) Assignees: Sanken Electric Co., Ltd., Niiza-shi (JP); Shimane University, Matsue-shi (JP)

( * ) Notice: Subject to any disclaimer, the term of this patent is extended or adjusted under 35 U.S.C. 154(b) by 0 days.

(21) Appl. No.: 12/250,843

(22) Filed: Oct. 14, 2008

(65) Prior Publication Data

US 2009/0262557 A1    Oct. 22, 2009

(30) Foreign Application Priority Data

Apr. 16, 2008    (JP) .............................. 2008-107209

(51) Int. Cl.
*H02J 1/00*    (2006.01)

(52) U.S. Cl. .......................................... 307/81; 307/87

(58) Field of Classification Search .................. 307/80, 307/81, 86, 87
See application file for complete search history.

(56) References Cited

U.S. PATENT DOCUMENTS 7,023,109 B2 *    4/2006    Amano ........................ 307/64
7,183,753 B2      2/2007    Tsuruya

OTHER PUBLICATIONS

U.S. Appl. No. 12/179,036, filed Jul. 24, 2008, Asuke, et al.
U.S. Appl. No. 12/250,839, filed Oct. 14, 2008, Asuke, et al.

* cited by examiner

*Primary Examiner*—Shawn Riley
(74) *Attorney, Agent, or Firm*—Oblon, Spivak, McClelland, Maier & Neustadt, L.L.P.

(57) ABSTRACT

A bi-directional DC-DC converter includes a first series circuit connected to ends of a first DC power source and including a first winding of a first reactor and a first switch; a second series circuit connected to ends of the first switch and including a second winding of the first reactor, a second reactor, a second switch, a third switch, and a second DC power source; a third series circuit connected to the ends of the first switch and including a fourth switch and the second DC power source; and a control circuit configured to turn on/off the switches and thereby carry out step-up and step-down operations between the first and second DC power sources.

3 Claims, 8 Drawing Sheets

BI-DIRECTIONAL DC-DC CONVERTER

BACKGROUND OF THE INVENTION

1. Field of the Invention

The present invention relates to a bi-directional DC-DC converter for carrying out a step-up operation and a step-down operation.

2. Description of the Related Art

Figure 1:
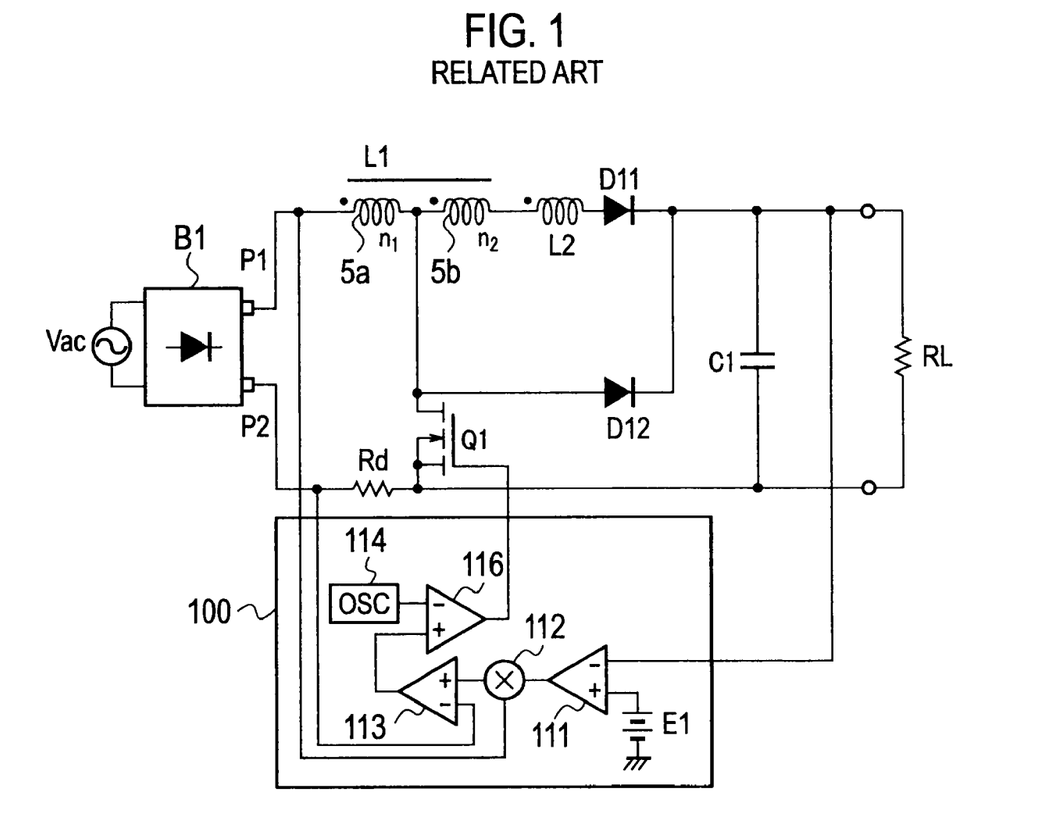
FIG. 1 is a circuit diagram illustrating a recovery-less step-up chopper circuit according to a related art.

A recovery-less step-up chopper circuit is known to serve as a high-efficiency, low-noise power converter for a vehicle. FIG. 1 is a circuit diagram illustrating a recovery-less step-up chopper circuit according to a related art. In FIG. 1, an AC power source Vac is connected to a full-wave rectifying circuit B1. The circuit B1 rectifies an AC power source voltage from the AC power source Vac and outputs the rectified voltage to a positive output end P1 and a negative output end P2.

Between the positive and negative output ends P1 and P2 of the full-wave rectifying circuit B1, there is connected a first series circuit that includes a step-up winding 5a (whose number of turns being n1) of a step-up reactor L1, a winding 5b (whose number of turns being n2) of the reactor L1, a zero-current switching (ZCS) reactor L2, a diode D11, a smoothing capacitor C1, and a current detecting resistor Rd.

Between the positive and negative output ends P1 and P2 of the full-wave rectifying circuit B1, there is also connected a second series circuit that includes the step-up winding 5a of the step-up reactor L1, a switch Q1 that is a MOSFET, and the current detecting resistor Rd. A diode D12 is connected between the smoothing capacitor C1 and a connection point of the step-up winding 5a, the winding 5b, and the drain of the switch Q1.

The switch Q1 turns on/off under PWM control conducted by a control circuit 100. The diode D11 and smoothing capacitor C1 form a rectifying-smoothing circuit. The smoothing capacitor C1 is connected in parallel with a load RL, so that the smoothing capacitor C1 smoothes a rectified voltage from the diode D11 and provides the load RL with DC power. The current detecting resistor Rd detects an input current passing through the full-wave rectifying circuit B1. The control circuit 100 includes an error amplifier 111, a multiplier 112, an error amplifier 113, an oscillator (OSC) 114, and a PWM comparator 116.

The error amplifier 111 has a positive terminal (+) to receive a reference voltage E1 and a negative terminal (−) to receive the voltage of the smoothing capacitor C1. The error amplifier 111 amplifies an error between the voltage of the smoothing capacitor C1 and the reference voltage E1 and outputs an error voltage signal to the multiplier 112. The multiplier 112 multiplies the error voltage signal from the error amplifier 111 by the full-wave rectified voltage from the positive output end P1 of the full-wave rectifying circuit B1 and outputs a resultant voltage to a positive terminal (+) of the error amplifier 113.

The error amplifier 113 has the positive terminal (+) to receive the multiplication resultant voltage from the multiplier 112 and a negative terminal (−) to receive a voltage proportional to the input current detected by the current detecting resistor Rd. The error amplifier 113 amplifies an error between the voltage from the current detecting resistor Rd and the multiplication resultant voltage and outputs an error voltage signal as a feedback signal FB to the PWM comparator 116. The oscillator 114 generates a triangular wave signal having a predetermined period.

The PWM comparator 116 has a negative terminal (−) to receive the triangular wave signal from the oscillator 114 and a positive terminal (+) to receive the feedback signal FB from the error amplifier 113. The PWM comparator 116 generates a pulse signal that is ON if the value of the feedback signal FB is equal to or higher than the value of the triangular wave signal and OFF if the value of the feedback signal FB is lower than the value of the triangular wave signal and applies the pulse signal to the gate of the switch Q1.

Namely, the PWM comparator 116 provides the switch Q1 with a duty pulse that is dependent on the output of the error amplifier 113, i.e., the difference between the output of the current detecting resistor Rd and the output of the multiplier 112. This duty pulse is a pulse width control signal that has a predetermined period and continuously compensates for variations in the AC power source voltage and DC load voltage. In this way, the related art controls an AC power source current waveform so that it may agree with an AC power source voltage waveform, thereby improving a power factor.

Operation of the recovery-less step-up chopper circuit illustrated in FIG. 1 will be explained. When the switch Q1 is turned on, a voltage produced by rectifying the AC power source voltage passes a current in a clockwise direction through a path extending along Vac, B1, 5a, Q1, Rd, B1, and Vac. The current of the switch Q1 starts from zero, and therefore, the switch Q1 achieves a zero-current switching (ZCS) operation. A current passing through the diode D11 decreases to zero to turn off the diode D11. In a recovery time of the diode D11, it passes a spike current through the switch Q1. This spike current is restricted by the impedance of the ZCS reactor L2.

When the switch Q1 is turned off, energy accumulated in the step-up reactor L1 during the ON period of the switch Q1 passes a current through the step-up reactor L1. This current is not suddenly passed to the ZCS reactor L2. Namely, a differential current between the current passing through the step-up reactor L1 and a current passing through the ZCS reactor L2 is passed through the diode D12 to the smoothing capacitor C1, to supply power to the load RL. The current passed through the diode D12 linearly decreases.

The current passing through the ZCS reactor L2 due to the energy accumulated in the ZCS reactor L2 is passed through the diode D11 to the smoothing capacitor C1, to supply power to the load RL. The current passing through the diode D11 linearly increases. When the current passing through the ZCS reactor L2 becomes equal to the current passing through the step-up reactor L1, the current passed through the diode D12 becomes zero.

When the switch Q1 is turned on, the current passing through the ZCS reactor L2 linearly decreases to zero to turn off the diode D11. As the current passing through the ZCS reactor L2 decreases, the current passed to the switch Q1 increases. When the current passed to the switch Q1 becomes equal to the current passing through the step-up reactor L1, the current passing through the ZCS reactor L2 becomes zero. Consequently, a zero-current switching operation is achieved.

In this way, a zero-current switching operation is carried out when the switch Q1 is turned on, to reduce a loss caused by the recovery of the rectifying diode D11 and make current changes gradual to achieve a high-efficient, low-noise switching operation.

SUMMARY OF THE INVENTION

The recovery-less step-up chopper circuit as illustrated in FIG. 1 reduces a recovery loss of a diode during a step-up operation.

On the other hand, the vehicle employing the recovery-less step-up chopper circuit of FIG. 1 also employs, for example, a step-down chopper circuit that conducts a regenerative operation, and in the regenerative operation, there is no way to minimize a loss caused by the recovery of a diode arranged in the step-down chopper circuit.

The present invention provides a bi-directional DC-DC converter capable of eliminating a diode recovery loss during a regenerative operation, as well as a diode recovery loss that occurs during a normal operation, thereby improving the efficiency of the converter.

According to a first aspect of the present invention, provided is a bi-directional DC-DC converter for stepping up a DC voltage of a first DC power source and supplying power to a second DC power source and for stepping down a DC voltage of the second DC power source and supplying power to the first DC power source. The bi-directional DC-DC converter includes a first reactor having first and second windings that are connected in series with each other and are electromagnetically coupled with each other; a first series circuit connected to ends of the first DC power source and including the first winding of the first reactor and a first switch; a second series circuit connected to ends of the first switch and including the second winding of the first reactor, a second reactor, a second switch, a third switch, and the second DC power source; a third series circuit connected to the ends of the first switch and including a fourth switch and the second DC power source; and a control circuit configured to turn on/off the first, second, third, and fourth switches and thereby carry out step-up and step-down operations between the first and second DC power sources.

According to a second aspect of the present invention, the control circuit in the step-down operation turns off the third and fourth switches, to discharge energy accumulated in the first reactor to the first DC power source; turns on the third switch in a zero-current switching mode with the use of the second reactor; and gradually reduces a current passing through the first diode and turns off the first diode.

According to a third aspect of the present invention, the control circuit further turns on the fourth switch, to reduce a current passing through the third switch with the use of electromotive force induced by the secondary winding of the first reactor; and turns off the third switch in a zero-voltage/zero-current switching mode.

DESCRIPTION OF THE PREFERRED EMBODIMENT

A bi-directional DC-DC converter according to an embodiment of the present invention will be explained in detail with reference to the drawings.

Embodiment 1

Figure 4:
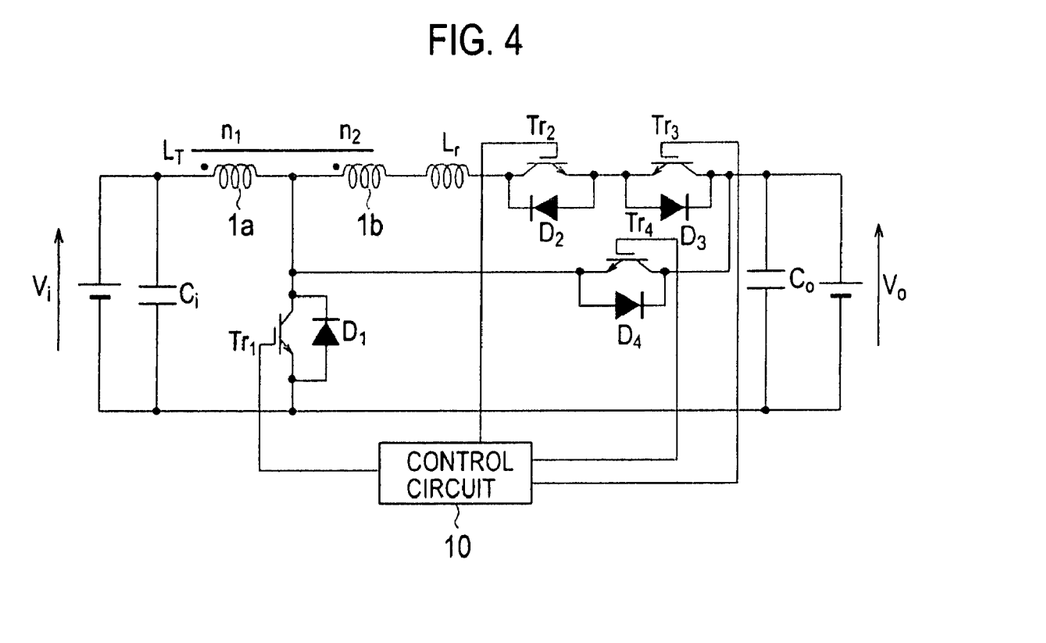
FIG. 4 is a circuit diagram illustrating a bi-directional DC-DC converter according to Embodiment 1 of the present invention.

FIG. 4 is a circuit diagram illustrating a bi-directional DC-DC converter according to Embodiment 1 of the present invention. The bi-directional DC-DC converter illustrated in FIG. 4 steps up a DC voltage of a first DC power source Vi and supplies power to a second DC power source Vo. Also, the bi-directional DC-DC converter of FIG. 4 steps down a DC voltage of the second DC power source Vo and supplies power to the first DC power source Vi. Namely, the bi-directional DC-DC converter of Embodiment 1 is a step-up chopper circuit provided with a regenerative function so that it operates as a step-down chopper circuit in a regenerative mode.

In FIG. 4, ends of the first DC power source Vi are connected to a smoothing capacitor Ci and ends of the second DC power source Vo are connected to a smoothing capacitor Co.

A first reactor LT has a first winding 1a of n1 as the number of turns and a second winding 1b of n2 as the number of turns. The first and second windings 1a and 1b are wound around a core (not illustrated), are electromagnetically coupled with each other, and are connected in series with each other. The ends of the first DC power source Vi are also connected to a first series circuit that includes the first winding 1a of the first reactor LT and a first switch Tr1. Between the collector and emitter of the first switch Tr1, there is connected a second series circuit that includes the second winding 1b of the first reactor LT, a second reactor Lr, a second switch Tr2, a third switch Tr3, and the second DC power source Vo. The second reactor Lr may be a leakage inductance between the first winding 1a and second winding 1b of the first reactor LT.

Ends of the first switch Tr1 are connected to a third series circuit that includes a fourth switch Tr4 and the second DC power source Vo.

The first to fourth switches Tr1 to Tr4 each may be an insulated gate bipolar transistor (IGBT) having a gate, an emitter, and a collector. Alternatively, each of the first to fourth switches Tr1 to Tr4 may be a MOSFET.

Between the collector and emitter of the first switch Tr1, a first diode D1 is connected in parallel. Between the collector and emitter of the second switch Tr2, a second diode D2 is connected in parallel. Between the collector and emitter of the third switch Tr3, a third diode D3 is connected in parallel. Between the collector and emitter of the fourth switch Tr4, a fourth diode D4 is connected in parallel.

A control circuit 10 applies gate signals Tr1g to Tr4g to the gates of the switches Tr1 to Tr4, respectively, to turn on/off the switches Tr1 to Tr4, thereby conducting DC voltage stepping up and stepping down operations.

The step-down operation of the bi-directional DC-DC converter according to Embodiment 1 will be explained with reference to an equivalent circuit illustrated in FIG. 5 and a timing chart of FIG. 6 that illustrates signals at various parts of the bi-directional DC-DC converter in the step-down operation.

Figure 5:
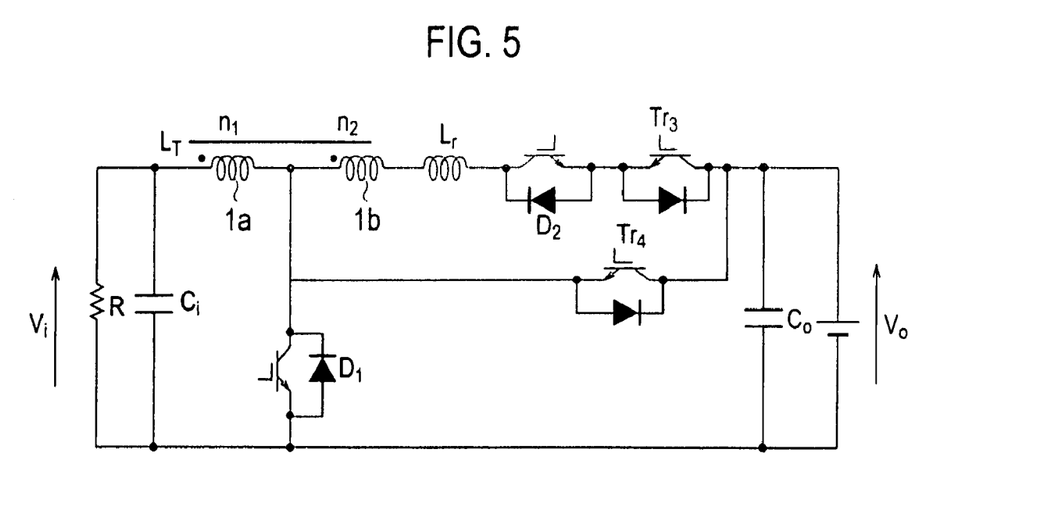
FIG. 5 is an equivalent circuit illustrating a step-down operation of the bi-directional DC-DC converter of Embodiment 1.

FIG. 5 illustrates an equivalent circuit of the bi-directional DC-DC converter of Embodiment 1 in the step-down operation. Parts as illustrated in FIG. 5 are used for the step-down operation, i.e., a regenerative operation and have been extracted from FIG. 4. In the regenerative (step-down) operation, the first DC power source Vi functions as a load resistor R.

Figure 6:
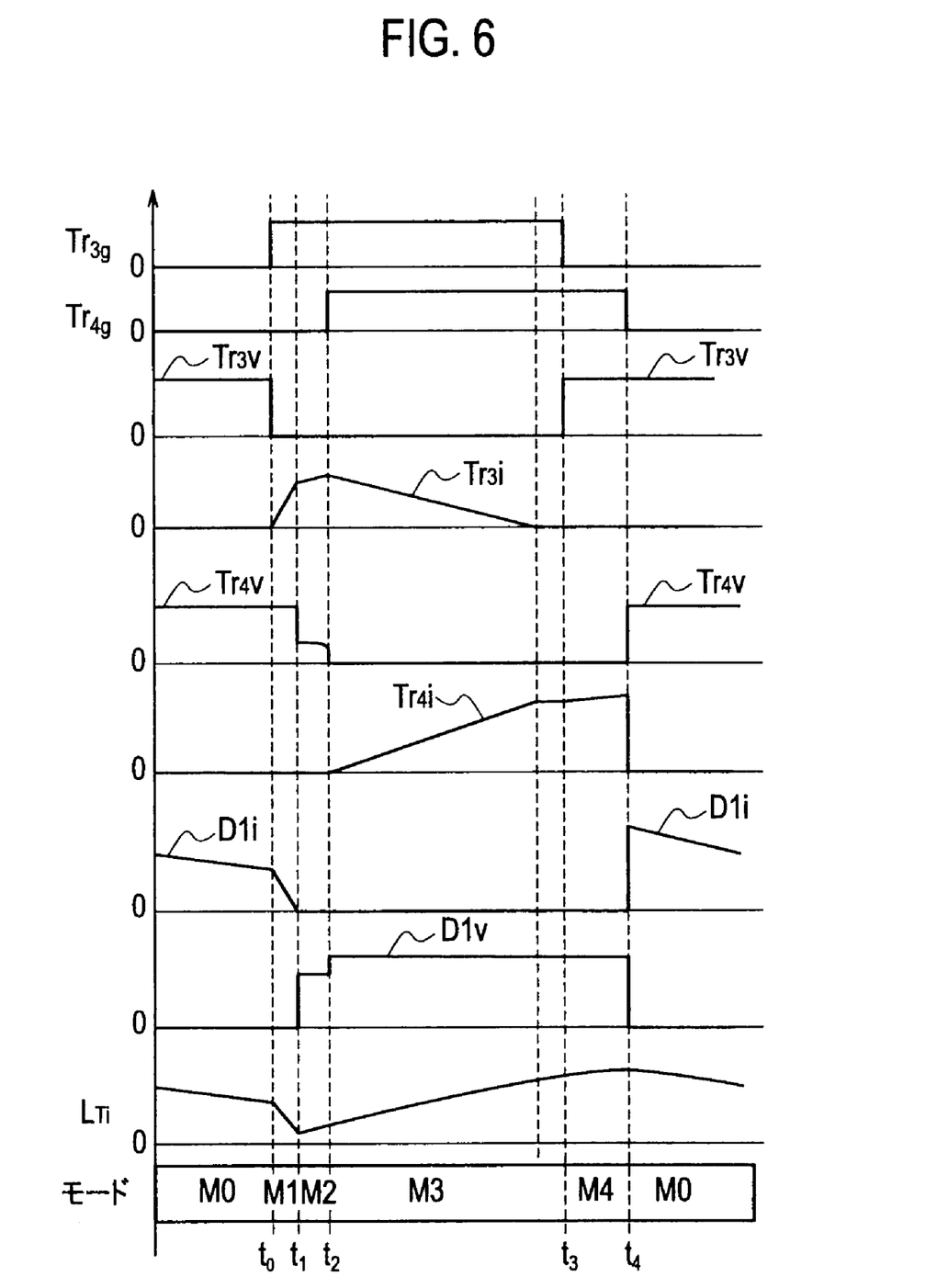
FIG. 6 is a timing chart illustrating signals at various parts of the bi-directional DC-DC converter of Embodiment 1 in the step-down operation.

In FIG. 6, Tr3g is a gate signal applied to the switch Tr3, Tr4g is a gate signal applied to the switch Tr4, Tr3v is a collector-emitter voltage of the switch Tr3, Tr3i is a collector current of the switch Tr3, Tr4v is a collector-emitter voltage of the switch Tr4, Tr4i is a collector current of the switch Tr4, D1i is a current of the diode D1, D1v is a terminal voltage of the diode D1, and LTi is a current of the first reactor LT. The step-down operation is divided into four circuit states, i.e., modes M0 to M4. Through the modes M0 to M4, the switches Tr1 and Tr2 are both OFF, and therefore, the reference marks Tr1 and Tr2 are not illustrated in FIG. 5.

In the mode M0, the gate signals Tr3g and Tr4g turn off the switches Tr3 and Tr4, and therefore, the input and output sides are electrically isolated from each other. At this time, currents D1i and LTi pass in a counterclockwise direction through a path extending along LT, R, D1, and LT, so that energy accumulated in the first reactor LT is discharged to the load resistor R to sustain a load voltage. The voltages Tr3v and Tr4v each are substantially equal to the voltage of the second DC power source Vo.

In the mode M1 at time t0, the gate signal Tr3g turns on the switch Tr3 and the second reactor Lr acts to gradually increase the current Tr3i. This realizes a zero current switching ON operation of the switch Tr3.

The current D1i passing through the diode D1 starts to move to an input line (Vo) and gradually decreases to zero at time t1 to start the mode M2. This realizes a recovery-less turning OFF operation of the diode D1.

In the mode M3 at time t2, the gate signal Tr4g turns on the switch Tr4 to shift the current passing through the switch Tr3 to the switch Tr4. This current shifting is gradual due to the action of the second reactor Lr, and therefore, the diode D2 gradually turns off. Namely, the diode D2 also achieves a recovery-less turning OFF operation.

Due to the second reactor Lr, the current Tr4i of the switch Tr4 rises with an inclination. As a result, the switch Tr4 achieves a zero current switching ON operation. The current Tr3i passing through the switch Tr3 decreases to zero due to electromotive force induced by the second winding 1b of the first reactor LT. With the voltage Tr3v being zero, the current Tr3i gradually decreases, and therefore, the switch Tr3 achieves a zero-voltage/zero-current switching OFF operation at time t3 in the mode M4.

Thereafter, the switch Tr4 turns off at time t4 to start the mode M0. In this way, a soft switching operation is achieved for each switch in the step-down operation.

Figure 7:
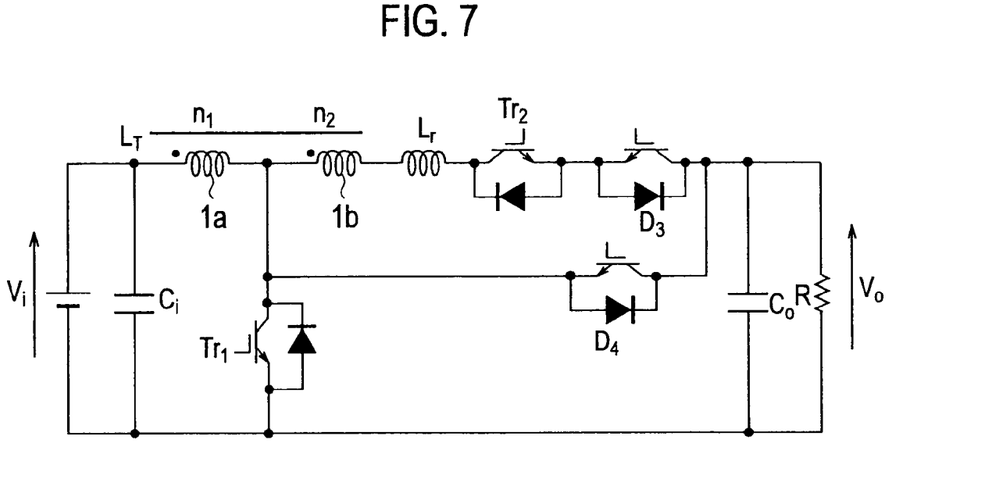
FIG. 7 is an equivalent circuit illustrating a step-up operation of the bi-directional DC-DC converter of Embodiment 1.
Figure 8:
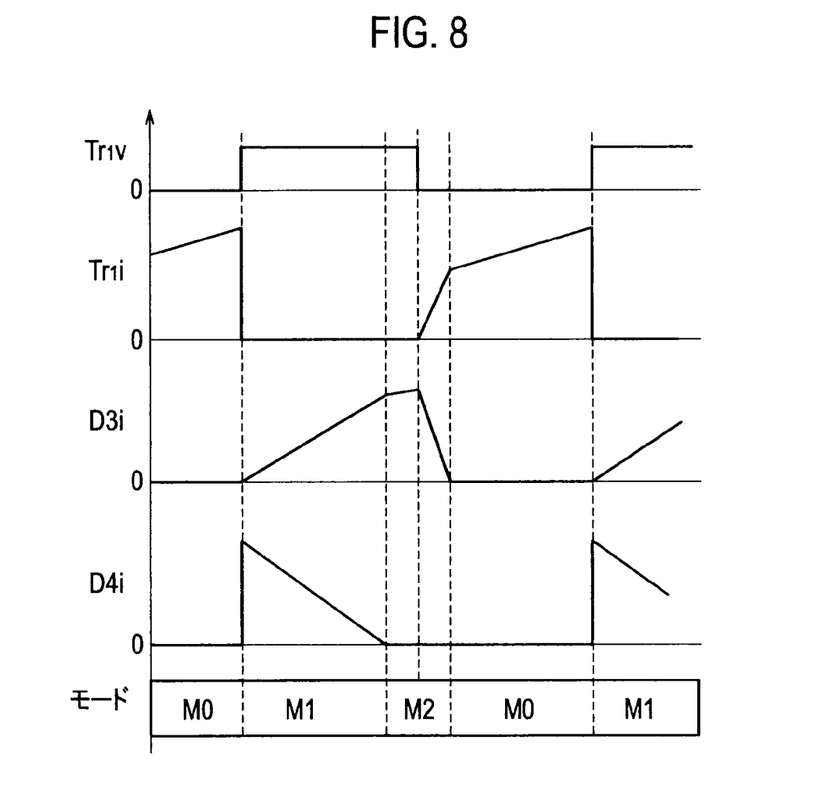
FIG. 8 is a timing chart illustrating signals at various parts of the bi-directional DC-DC converter of Embodiment 1 in the step-up operation.

A step-up operation of the bi-directional DC-DC converter according to Embodiment 1 will be explained with reference to FIG. 7 illustrating an equivalent circuit of the bi-directional DC-DC converter in the step-up operation and a timing chart of FIG. 8 illustrating signals at various parts of the bi-directional DC-DC converter in the step-up operation. As illustrated in FIG. 7, the second DC power source Vo functions as a load resistor R in the step-up operation.

In FIG. 8, Tr1v is a collector-emitter voltage of the switch Tr1, Tr1i is a collector current of the switch Tr1, D3i is a current of the diode D3, and D4i is a current of the diode D4. Through modes M0 to M2 of the step-up operation, the switches Tr3 and Tr4 are both OFF, and therefore, the reference marks Tr3 and Tr4 are not illustrated in FIG. 7.

In the mode M0, the switch Tr1 turns on to pass the current Tr1i in a clockwise direction through a path extending along Vi, 1a, Tr1, and Vi. At this time, the diodes D3 and D4 pass no current, to prevent backward voltage from the output side (Vo) and first reactor LT.

In the mode M1, the switch Tr1 turns off and the switch Tr2 turns on. Since the diode D3 is connected in series with the second reactor Lr, the current D3i does not suddenly increase. Initially, the current D4i passes in a clockwise direction through a path extending along Vi, 1a, D4, Co, and Vi.

Thereafter, a voltage generated by the second winding 1b of the first reactor LT gradually increases a current passing through the second reactor Lr, i.e., the current D3i passing through the diode D3. As a result, a current shift occurs from the diode D4 to the diode D3, to slowly turn off the diode D4.

In the mode M2, the switch Tr1 turns on and the diode D3 slowly turns off because the diode D3 passing the current D3i is connected in series with the second reactor Lr to restrict a current decreasing inclination. Also, an increase in the current Tr1i from the ON timing thereof is gradual due to the first reactor LT. This results in minimizing an overlap between the current Tr1i and voltage Tr1v of the switch Tr1 when the switch Tr1 is turned on, thereby achieving a zero current switching operation of the switch Tr1.

Figure 9:
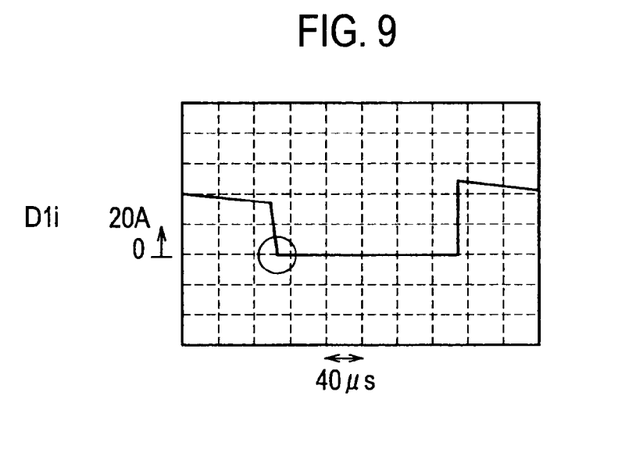
FIG. 9 is a graph illustrating a simulated current waveform of a diode D1 in the bi-directional DC-DC converter of Embodiment 1 in a DC voltage step-down operation.
Figure 10:
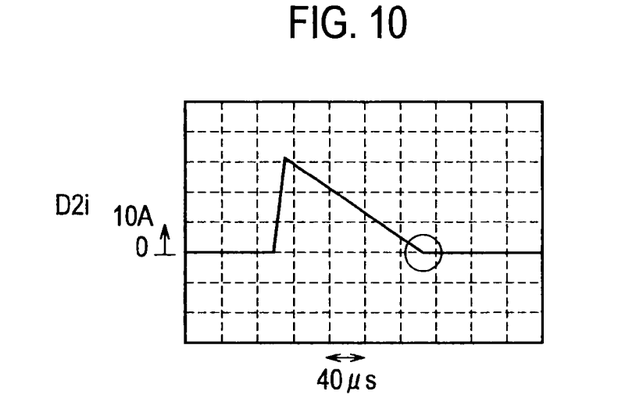
FIG. 10 is a graph illustrating a simulated current waveform of a diode D2 in the bi-directional DC-DC converter of Embodiment 1 in the DC voltage step-down operation.

FIGS. 9 to 12 illustrate simulated waveforms at various parts of the bi-directional DC-DC converter of the present embodiment in an operation of stepping down a voltage of 500 V to a voltage of 200 V at a switching frequency of 20 kHz. FIG. 9 illustrates a current waveform of the diode D1 and FIG. 10 illustrates a current waveform of the diode D2. As is apparent from FIG. 9, the current D1i in the mode M1 gradually decreases due to the second reactor Lr, and therefore, the diode D1 turns off without recovery. As is apparent from FIG. 10, the diode D2 turns off recovery-less.

As a result, the diodes D1 and D2 cause no power loss due to recovery, thereby improving the efficiency of the bi-directional DC-DC converter.

Figure 11:
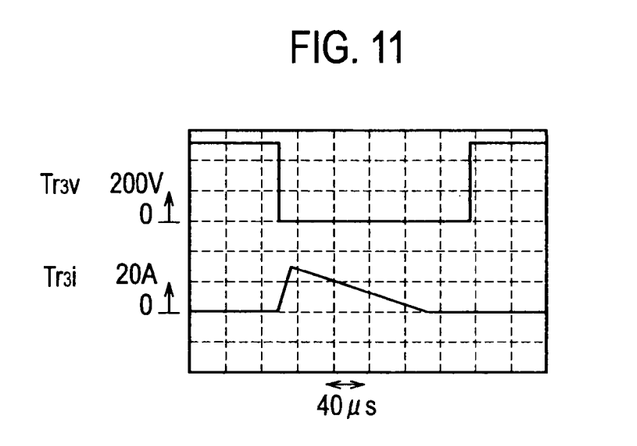
FIG. 11 is a graph illustrating simulated voltage and current waveforms of a switch Tr3 in the bi-directional DC-DC converter of Embodiment 1 in the DC voltage step-down operation.
Figure 12:
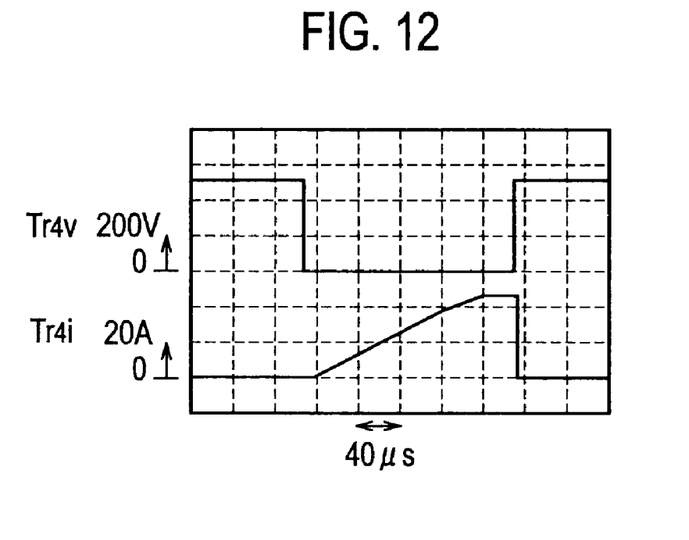
FIG. 12 is a graph illustrating simulated voltage and current waveforms of a switch Tr4 in the bi-directional DC-DC converter of Embodiment 1 in the DC voltage step-down operation.

FIG. 11 illustrates waveforms of the voltage Tr3v and current Tr3i of the switch Tr3 and FIG. 12 illustrates waveforms of the voltage Tr4v and current Tr4i of the switch Tr4. As is apparent from FIG. 11, when the switch Tr3 turns on, the current Tr3i gradually rises from 0 A due to the second reactor Lr, so that the switch Tr3 achieves a zero current switching operation.

In the mode M3, the current of the switch Tr3 gradually shifts to the switch Tr4 and the switch Tr3 turns off when the current Tr3i becomes 0 A. Namely, like the switching ON operation of the switch Tr3, the switching OFF operation of the switch Tr3 is a zero-current switching operation.

As is apparent from FIG. 12, when the switch Tr4 turns on, the current Tr4i passing through the switch Tr4 gradually rises from 0 A due to the second reactor Lr, so that the switch Tr4 achieves a zero-current switching operation. This reduces a switching loss and improves efficiency.

Figure 2:
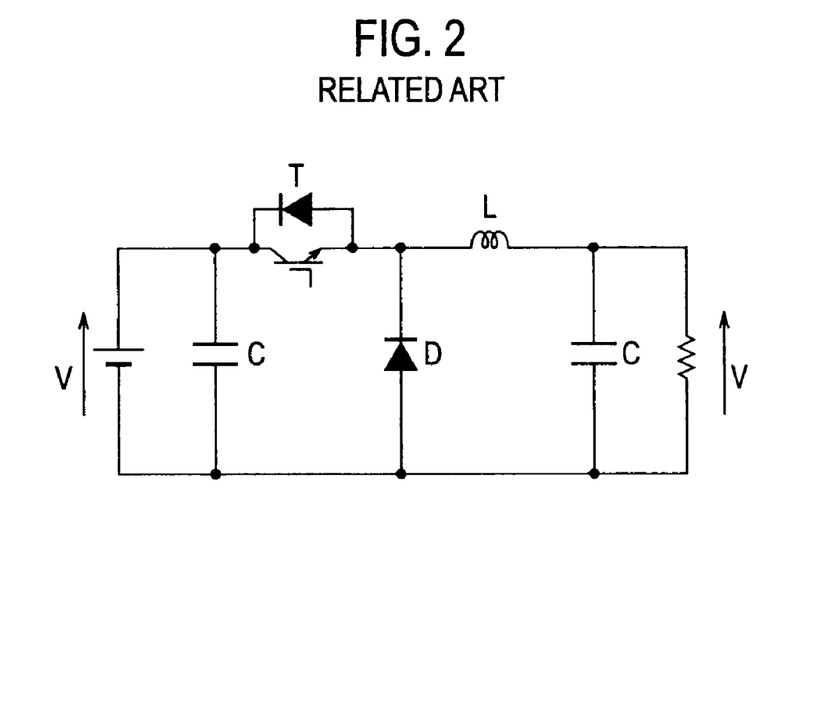
FIG. 2 is a circuit diagram illustrating a step-down chopper circuit according to a related art.
Figure 3:
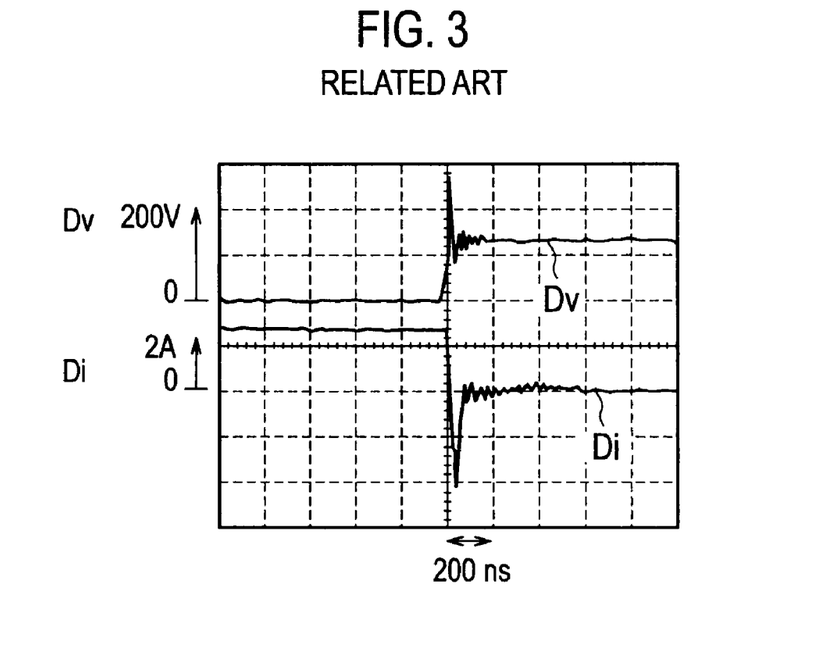
FIG. 3 is a graph illustrating the turn-off voltage and current waveforms of a diode in the step-down chopper circuit of the related art as illustrated in FIG. 2.
Figure 13:
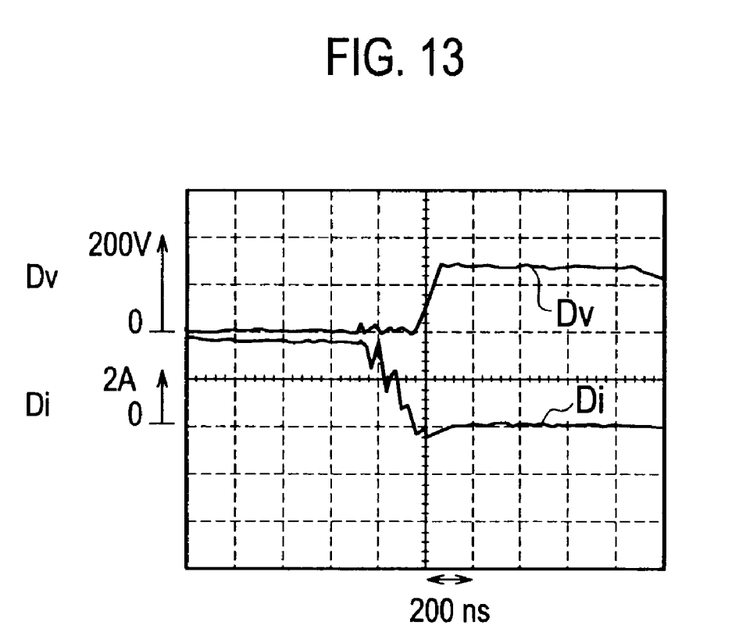
FIG. 13 is a graph illustrating the turn-off voltage and current waveforms of a diode in the bi-directional DC-DC converter of Embodiment 1.

Comparative evaluations will be explained. The applicant of the present invention has conducted comparative evaluations on the present embodiment and a related art. FIG. 2 is a circuit diagram illustrating a step-down chopper circuit according to the related art. FIG. 3 illustrates the waveforms of turn-off voltage Dv and current Di of a diode D in the step-down chopper circuit of the related art illustrated in FIG. 2. FIG. 13 illustrates the waveforms of turn-off voltage Dv and current Di of a diode in the bi-directional DC-DC converter of the present embodiment.

From comparison between FIG. 3 and FIG. 13, it is understood that the present embodiment as illustrated in FIG. 13 remarkably reduces a diode recovery current that causes a switching loss and noise.

Figure 14:
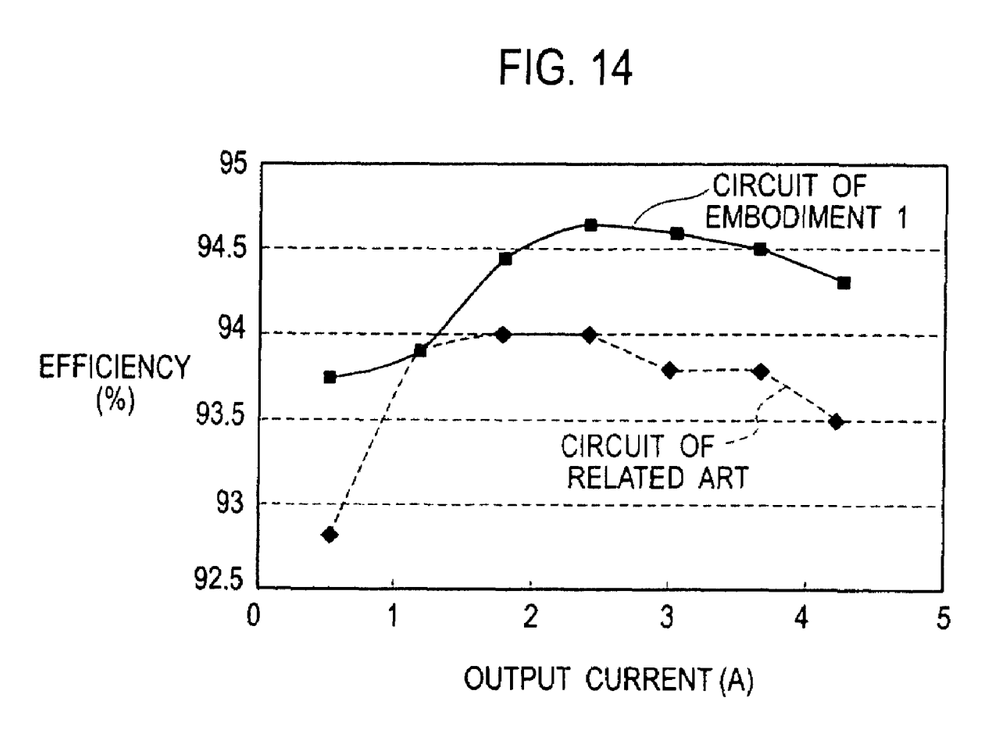
FIG. 14 is a graph illustrating comparison of output current and efficiency between Embodiment 1 and a related art.

The applicant of the present invention has also conducted efficiency comparison between the present embodiment and a related art. FIG. 14 illustrates a comparison of output current efficiency between the present embodiment and the related art in a step-down operation conducted under the conditions of an input voltage of 130 V, an output voltage of 70 V, and a switching frequency of 80 kHz. It is understood from FIG. 14 that the present embodiment is superior in efficiency than the related art for every output current.

The present invention is not limited to the bi-directional DC-DC converter of the present embodiment. For example, the switch Tr2 as illustrated in FIG. 4 may be omitted and a parallel circuit composed of a switch Tr5 of IGBT and a diode D5 may be inserted between the cathode of the diode D2 and the cathode of the diode D3, to form a modified bi-directional DC-DC converter. Such a modification will operate and function like the bi-directional DC-DC converter of the present embodiment.

In this way, the bi-directional DC-DC converter according to the present invention minimizes the recovery action of a diode even in a regenerative operation and improves efficiency.

This application claims benefit of priority under 35USC§119 to Japanese Patent Application No. 2008-107209, filed on Apr. 16, 2008, the entire content of which is incorporated by reference herein. Although the invention has been described above by reference to certain embodiments of the invention, the invention is not limited to the embodiments described above. Modifications and variations of the embodiments described above will occur to those skilled in the art in light of the teachings. The scope of the invention is defined with reference to the following claims.

What is claimed is:

1. A bi-directional DC-DC converter for stepping up a DC voltage of a first DC power source and supplying power to a second DC power source and for stepping down a DC voltage of the second DC power source and supplying power to the first DC power source, comprising:
   a first reactor having first and second windings those are connected in series with each other and are electromagnetically coupled with each other;
   a first series circuit including the first winding of the first reactor and a first switch and being connected to ends of the first DC power source;
   a second series circuit including the second winding of the first reactor, a second reactor, a second switch, a third switch, and the second DC power source and being connected to ends of the first switch and;
   a third series circuit including a fourth switch and the second DC power source and being connected to the ends of the first switch; and
   a control circuit configured to turn on/off the first, second, third, and fourth switches and thereby carry out step-up and step-down operations between the first and second DC power sources.

2. The bi-directional DC-DC converter of claim 1, wherein, in the step-down operation, the control circuit:
   turns off the third and fourth switches, to discharge energy accumulated in the first reactor to the first DC power source;
   turns on the third switch in a zero-current switching mode with the use of the second reactor; and
   gradually reduces a current passing through the first diode and turns off the first diode.

3. The bi-directional DC-DC converter of claim 2, wherein the control circuit further:
   turns on the fourth switch, to reduce a current passing through the third switch with the use of electromotive force induced by the secondary winding of the first reactor; and
   turns off the third switch in a zero-voltage/zero-current switching mode.

* * * * *